United States Patent [19]

Swaminathan et al.

[11] Patent Number: 5,537,509
[45] Date of Patent: Jul. 16, 1996

[54] COMFORT NOISE GENERATION FOR DIGITAL COMMUNICATION SYSTEMS

[75] Inventors: Kumar Swaminathan, Gaithersburg, Md.; Brian M. McCarthy, Lafayette Hill, Pa.

[73] Assignee: Hughes Electronics, Los Angeles, Calif.

[21] Appl. No.: 890,747

[22] Filed: May 28, 1992

Related U.S. Application Data

[63] Continuation-in-part of Ser. No. 622,232, Dec. 6, 1990, Pat. No. 5,299,198.

[51] Int. Cl.$^6$ ............................................. G10L 9/00
[52] U.S. Cl. ........................ 395/2.37; 395/2.23; 395/2.32
[58] Field of Search ........................... 381/47, 36, 40; 364/717; 395/2.23, 2.24, 2.28, 2.29, 2.32, 2.35, 2.36, 2.37; 379/58–59; 455/50.1, 51.1, 51.2, 63, 67.3, 222, 296, 297

[56] References Cited

U.S. PATENT DOCUMENTS

| | | | |
|---|---|---|---|
| 4,061,878 | 12/1977 | Adoul et al. | 179/1 SC |
| 4,110,560 | 8/1978 | Leary et al. | 395/2.23 |
| 4,142,066 | 2/1979 | Ahamed | 381/47 |
| 4,528,659 | 7/1985 | Jones, Jr. | 370/80 |
| 4,630,305 | 12/1986 | Borth et al. | 395/2.35 |
| 4,754,450 | 6/1988 | Lynk, Jr. et al. | 370/29 |
| 5,042,069 | 8/1991 | Chhatwal | 395/2.35 |
| 5,060,269 | 10/1991 | Zinser | 381/36 |
| 5,093,863 | 3/1992 | Gatand et al. | 395/2.16 |
| 5,121,349 | 6/1992 | Naito | 364/717 |
| 5,125,030 | 6/1992 | Nomura et al. | 395/2.35 |
| 5,199,076 | 3/1993 | Taniguchi et al. | 381/36 |
| 5,251,261 | 10/1993 | Meyer et al. | 381/36 |
| 5,293,449 | 3/1994 | Tzeng | 395/2.32 |
| 5,295,225 | 3/1994 | Kane et al. | 395/2.35 |
| 5,329,550 | 7/1994 | Rousseau et al. | 379/59 |
| 5,333,176 | 7/1994 | Burke et al. | 379/58 |

OTHER PUBLICATIONS

Southcott et al., "Voice Control of the Pan–European Digital Mobile Radio System," Globecom '89, Nov. 27–30, 1989, pp. 1070–1074.

Gruet et al., "Experiments with a Regular Pulse CELP Coder for the Pan European Half Rate Channel," ICASSP '91, May 14–17, 1991, pp. 617–620.

Southcott, "Speech Processing in the Pan–European Digital Cellular Mobile Telephone System," IEE Colloq. No. 139: Digitized Speech Comm. via Mobile Radio, Dec. 12, 1988, pp. 5/1–5.

"Comfort Noise Aspects for Full–Rate Speech Traffic Channels," GSM 06.12, version 3.0.1, European Telecommunication Standard, Feb. 1992.

"European Digital Cellular Telecommunications Systems (Phase 2); Comfort Noise Aspect for Full Rate Speech Traffic Channels (GSM 06.12)," European Telecommunication Standard Sep. 1994.

Vary et al., "Speech Codec for the European Mobile Radio System," Globecom '89, Nov. 29–30, 1989, pp. 1065–1069.

(List continued on next page.)

Primary Examiner—Allen R. MacDonald
Assistant Examiner—Michael Sartori
Attorney, Agent, or Firm—Gordon R. Lindeen, III; Wanda Denson-Low

[57] ABSTRACT

A digital discontinuous cellular communication system has a transmitter that transmits two frames of data following detection of voice inactivity. A receiver includes a comfort noise generator that uses the two frames of data to output noise to the speaker during period of voice inactivity. The comfort noise generator includes synthesis codebook with samples scaled by actual background noise and excitation codebook with samples filtered and scaled by the background noise that are combined to produce comfort noise having attributes and loudness level of the received background noise prior to interruption of transmission. The scaled signals are weighted to vary the loudness level and spectral attributes.

7 Claims, 4 Drawing Sheets

OTHER PUBLICATIONS

Lever et al., "RPCELP: A High Quality and Low Complexity Scheme for Narrow Band Coding of Speech," 1988 European Conf. on Electronics, Jun. 13–17, 1988, pp. 24–27.

Liu et al., "PACELP: A High Quality and Low Complexity Scheme for Narrow Band Coding of Speech," Circuits and Systems, 1991 China International Conf., Jun. 16–17, 1991, pp. 29–32.

COMFORT NOISE GENERATION FOR DIGITAL COMMUNICATION SYSTEMS

CROSS-REFERENCE TO RELATED APPLICATIONS

This application is a continuation-in-part of application Ser. No. 07/622,232 filed Dec. 6, 1990 entitled "METHOD AND APPARATUS FOR EXPLOITATION OF VOICE INACTIVITY TO INCREASE THE QUALITY OF A TIME DIVISION MULTIPLE ACCESS RADIO COMMUNICATIONS SYSTEM", now U.S. Pat. No. 5,299,198, which is assigned to the assignee of the current application, the priority of which is hereby claimed and the disclosure of which is hereby incorporated by reference fully herein.

BACKGROUND OF THE INVENTION

1. Field of the Invention

The present invention relates to digital voice communication; and, more particularly, to a digital voice communication system and method that involves the radio transmission of synthesized speech.

Although the present invention is suitable for many different voice communication systems that involve switching "on" and "off" of voice transmission during periods of silence, it is particularly advantageous for use in cellular digital telephone systems and is described in connection therewith.

2. Discussion of Related Art

A cellular communication system is a mobile telephone service where radio coverage is divided into cells; and each cell is assigned a number of available radio frequencies. A mobile telephone station transmits and receives control and voice communication information from a base station within the same cell. The base stations are controlled by a cellular system switching and control network that provides connection with the world wide telecommunication system.

In digital communication systems, assigned frequencies are divided into individual channels of communication, with the transmit and receive frequencies being separated from each other. Each channel of information has a frame format, that is, each channel transmits a succession of frames, which has a duration typically of forty milliseconds, and constitutes one cycle of a regularly recurring series. Each frame of information is transmitted in one of six time slots. Each slot includes one hundred sixty-two symbols, and has a duration of approximately 6.67 milliseconds. Each slot corresponds to a burst of RF energy that includes compressed digital speech signals, which are decompressed at the receiving station and converted to analog speech.

An encoder is provided in each transmitter, both at a base station and a mobile station, which synthesizes the speech signals before modulation and transmission thereof. One type of cellular communication system includes a technique for low rate speech coding, referred to as Codebook Excited Linear Prediction (CELP), which involves searching a table or codebook of randomly distributed excitation vectors for that vector which, when filtered through pitch and linear predictive coding short term synthesis filters, produces an output sequence which is closest to the input sequence. This output sequence of synthesized speech codes occurs upon excitation of the input sequence which, in turn, occurs upon the introduction of the digital equivalent of analog speech.

Upon the detection of voice inactivity, which occurs between words, sentences, or pauses in conversation, for example, the input to the encoder is switched off, which interrupts transmission of the RF energy. This switching on and off of the transmitter during a conversation produces audible switching artifacts, which at times leads the listener to believe the connection is being inadvertently interrupted, and at the very least, causes the listener substantial annoyance and discomfort.

Heretofore, it has been proposed to produce an artificial background noise during periods of voice inactivity. This was in the form of background noise that was encoded and generated independently of the conversation preceding the inactivity. Although suitable for the purposes intended, the proposed background noise generation was at times substantially different from the background noise of the conversation during periods of voice activity, which may be unpleasant and disconcerting to the listener.

SUMMARY OF THE INVENTION

One of the objects of the present invention is to alleviate the annoyance and discomfort to a listener caused by on and off switching artifacts between intermittent periods of voice activity during a conversation over a digital communication system.

Another object of the present invention is to provide background noise for a discontinuous transmission and receiving system during periods of voice inactivity that has the attributes of background noise during periods of voice activity.

Additional objects and advantages of the invention will be set forth in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention is a method of generating background noise during intervals of voice inactivity in a digital communication system, having a transmitter with an encoder for encoding and transmitting discontinuous frames of digital information, and a receiver with a decoder for receiving and decoding the discontinuous frames of transmitted information, comprising, detecting in the transmitter, transitions between voice activity and voice inactivity, discontinuing transmission of digital information a predetermined time following detection of voice inactivity, resuming transmission upon detection of voice activity, decoding digital output data received from the transmitter, detecting in receiver transitions between voice activity and voice inactivity of the transmitter, processing the decoded digital output data including data received after the detection of voice inactivity in the receiver to generate data having attributes of background noise transmitted during the predetermined time following detection of voice inactivity, and applying an analog equivalent of the generated data continuously to an output speaker of the receiver during discontinuance of transmission by the transmitter.

In another aspect, the present invention is a digital communication system comprising a transmitter having an analog to digital converter for converting analog input speech to digital data, a voice encoder for encoding the digital data, a voice activity detector for detecting a transition between voice activity and inactivity, a switch for discontinuing transmission of the encoded data a predetermined time period subsequent to the detection of voice inactivity, a receiver disposed remote from the transmitter having a decoder for decoding the received data, a speaker for outputting an analog equivalent of the decoded data, a comfort noise generator at the receiver for outputting digital signals corresponding to noise having a spectral shape and loudness level similar to the received data decoded by the decoder, and a switch at the receiver for connecting the generator output to the speaker at the expiration of the predetermined time period following detection of voice inactivity.

In still another aspect, the present invention is a system for generating background noise for a digital communication system, comprising means for receiving synthesized noise, means for deriving an average loudness level of the received noise, means for deriving filter coefficients from the received noise, a synthesis codebook having a table of values corresponding to long term estimates of background noise, an excitation codebook having a table of values corresponding to long term spectrally flattened background noise estimates, an infinite impulse response filter responsive to the excitation table values in accordance with the derived filter coefficients to output signals having spectral shape attributes corresponding to the received noise, means for scaling the synthesized background noise estimate signals to produce a first series of signals having a loudness level corresponding to average RMS level over a predetermined time period following detection of voice inactivity and means for scaling the filtered spectral shape signals to produce a second series of signals each having a spectral shape corresponding to long term spectral shape of the background noise having said loudness level, means for weighting the first and second signals to vary the loudness level and spectral shape periodically, and means for combining the weighted first and second series of signals to generate the comfort noise.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENTS

Figure 1:
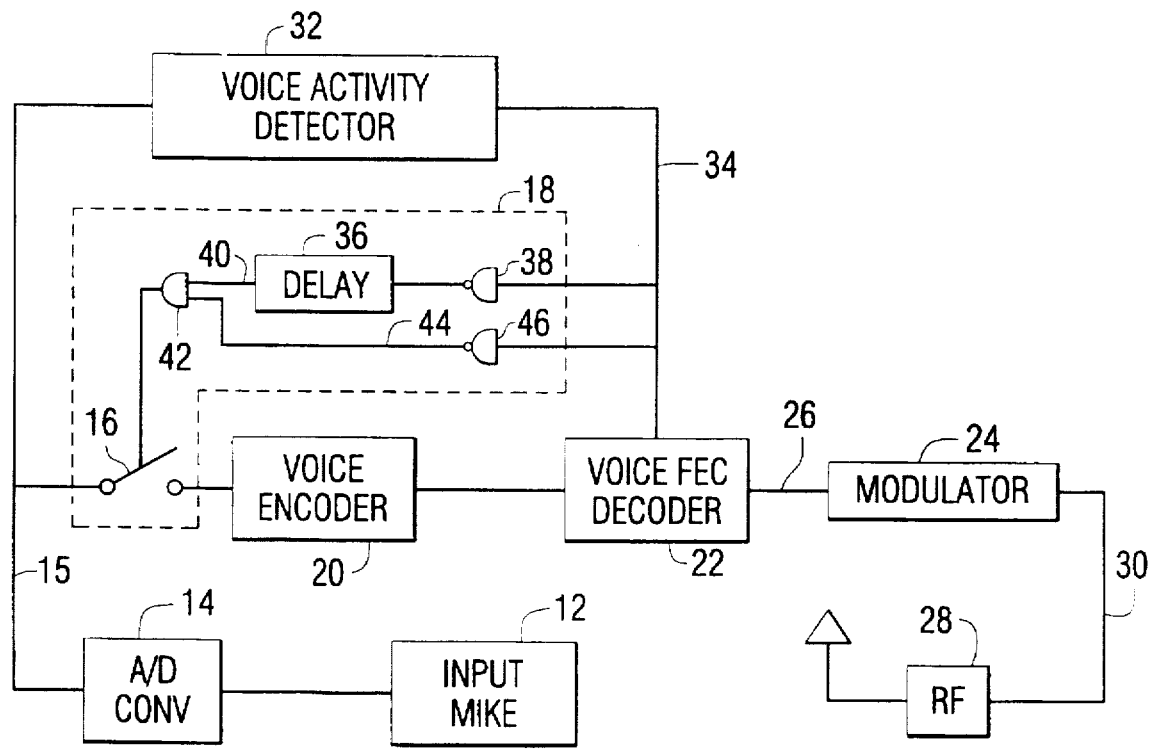
FIG. 1 is a schematic block diagram of the transmitting portion of the communication system incorporating the present invention.

Reference will now be made in detail to the present preferred embodiment of the invention, an example of which is illustrated in the accompanying drawings. Wherever possible, the same reference numerals will be used throughout the drawings to refer to the same or like components. When using the term connected or electrically connected herein, it is not intended to mean directly connected but may mean ultimately connected, where components may be connected therebetween but are omitted in that they do not aid in the understanding of the invention. Also, when using the term switch herein, it is understood that it can be any device or method for connecting inputs and outputs of software or hardware components.

The system of the present invention comprises a transmitter with a microphone input, an analog to digital converter, a delay/instantaneous switch circuit, a voice encoder, a voice forward error correction encoder, a voice activity detector, a modulator, and an RF power amplifier.

As herein embodied and shown in FIG. 1, a transmitter generally referred to at 10 has a microphone 12 for inputting analog speech. Connected to the microphone is an analog to digital converter 14 for converting the analog input speech to digital data. Electrically coupled to the output of the A/D converter over line 15 through switch 16 of switching circuit 18 is a voice encoder 20 for compressing digital speech signals. A voice FEC encoder 22 has an input coupled to the output of voice encoder 20 for providing parity bits, for example, to protect against transmission errors. A modulator 24 has an input coupled to output 26 of voice FEC encoder 22 for modulating the digital speech signals. Power amplifiers 28 are connected to modulator 24 over output line 30. A voice activity detector 32 has an input coupled to output line 15 of A/D converter 14 and an output 34 coupled to voice FEC encoder 22. Output line 34 represents a voice activity flag that is high as long as a voice is detected and goes low when a voice ceases. Switch circuit 18 includes a delay component 36 having an input connected to line 34 through a NOT gate 38 and an output 40 connected to switch 16 through AND gate 42. Line 34 is also connected via a NOT gate 46 directly to AND gate 42 in parallel with delay component 36 over line 44.

When input 40 of gate 42 is low and input 44 is low, switch 16 is closed. When input 44 goes high and input 40 goes high, switch 16 opens. This causes a delay of eighty milliseconds upon the cessation of voice activity before switch 16 opens. Upon the resumption of voice activity, line 34 goes "high" which causes input 44 to go low, which immediately causes the switch 16 to close without delay. The changing of input 40 to low after eighty milliseconds does not change the operated state of the switch. Thus, there is a delay in opening switch 16 upon the detection of voice inactivity, but no delay in closing switch 16 upon the detecting of voice activity.

The system of the present invention comprises a receiver, having RF power amplifiers, a demodulator, a voice FEC decoder, a voice decoder, a delay/instantaneous switch, a digital to analog converter, an output speaker, and a comfort noise generator.

Figure 2:
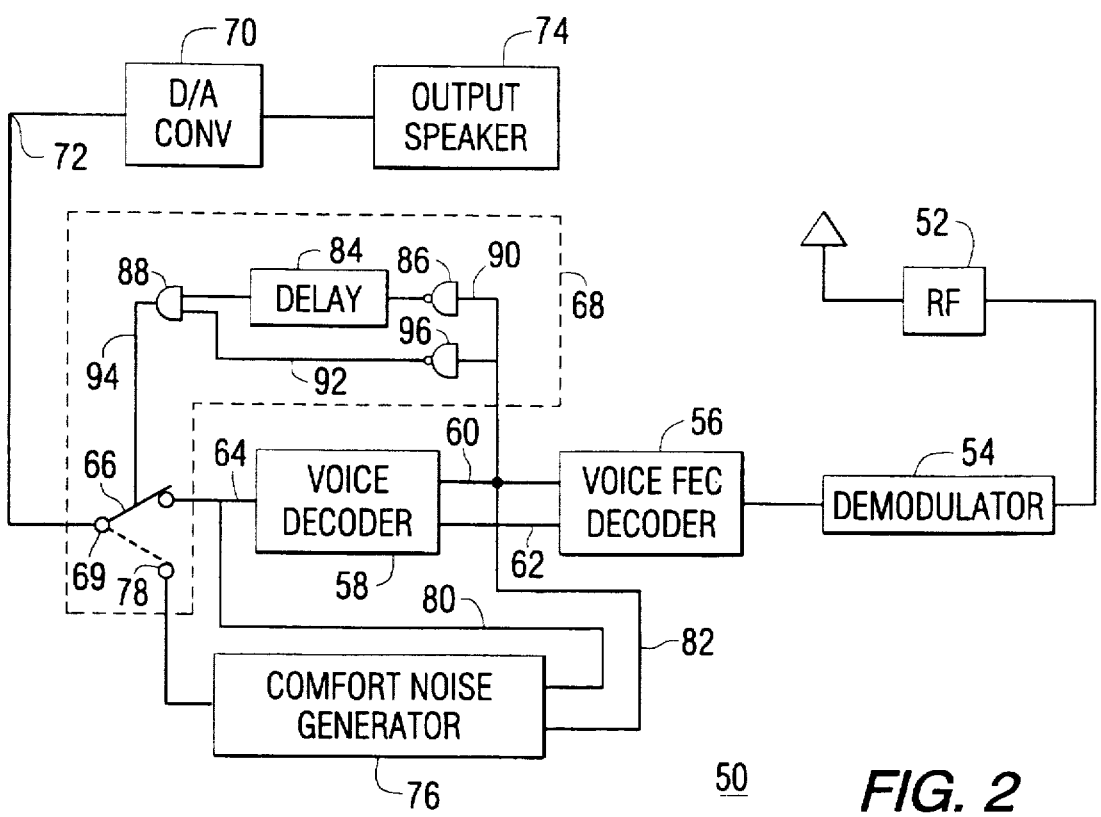
FIG. 2 is a schematic block diagram of the receiving portion of the communication system incorporating the present invention.

As herein embodied and shown in FIG. 2, a receiver generally referred to as 50, comprises power amplifiers 52 for amplifying incoming signals, a demodulator 54 having an input connected to amplifiers 52, and an output connected to voice FEC decoder 56. Decoder 56 is connected at its output to voice decoder 58 over lines 60 and 62. Voice decoder 58 is connected at its output 64 to one terminal of switch 66 of delay/instantaneous switch circuit 68. Switch 66 has a common terminal 69 connected to D/A converter over input line 72. An output speaker 74 is connected to output 64 of the D/A converter. A comfort noise generator 76 has an output connected to terminal 78 of switch 66 and in input 80 connected to the output of voice decoder 58, and another input over line 82 connected to line 60 at the input of voice decoder 58. Line 60 changes from "one" to "zero" upon the transition from voice activity to voice inactivity. Output line 80 of voice decoder 58 outputs synthesized speech from voice decoder 64 to the input of comfort noise generator 76. Delay/instantaneous switch 68 includes a delay component 84 having a NOT gate 86 disposed in the input of delay component 84 and an AND gate 88 connected in the output of delay component 84. Upon the detection of a transition from voice activity to voice inactivity, line 60 goes from one to zero which changes both input 90 and 92 of switch 68 to high. After a delay of eighty milliseconds through delay component 84, output line 94 of gate 88 goes high which connects switch 66 to terminal 78 of generator 76 and disconnects switch 66 from voice decoder 84. Upon transition from voice inactivity to voice activity, line 60 goes high which immediately causes input 92 of AND gate 88 to go low, and change the position of switch 66 to disconnect switch 66 from the output of the comfort generator and connect it to output 64 of voice decoder 58. A delay of eighty milliseconds will have no effect.

When input to gate 88 from delay component 84 goes low, switch 66 will remain connected to voice decoder 58 until line 92 goes low.

Thus, similar to the transmitter 10, a transition from voice activity to inactivity causes a delay of eighty milliseconds before the output of comfort noise generator 88 is connected to input line 72 of D/A converter 70; and a transition from voice inactivity to voice activity causes an immediate connection of voice decoder 58 to input line 72 of the D/A converter.

In operation, during each pause in the conversation, background noise corresponding to two frames of information is transmitted and received prior to discontinuing transmission. Thus, in the transmitter 10 that is communicating with this receiver 50, eighty milliseconds of background noise is being transmitted after the transition from voice activity to voice inactivity. During this eighty millisecond delay in the receiver, ten, separate eight millisecond samples of the transmitted background noise are input to comfort noise generator 76 over line 80 and simultaneously output through switch 66, terminal 68, over line 72 to D/A converter 70.

Figure 3:
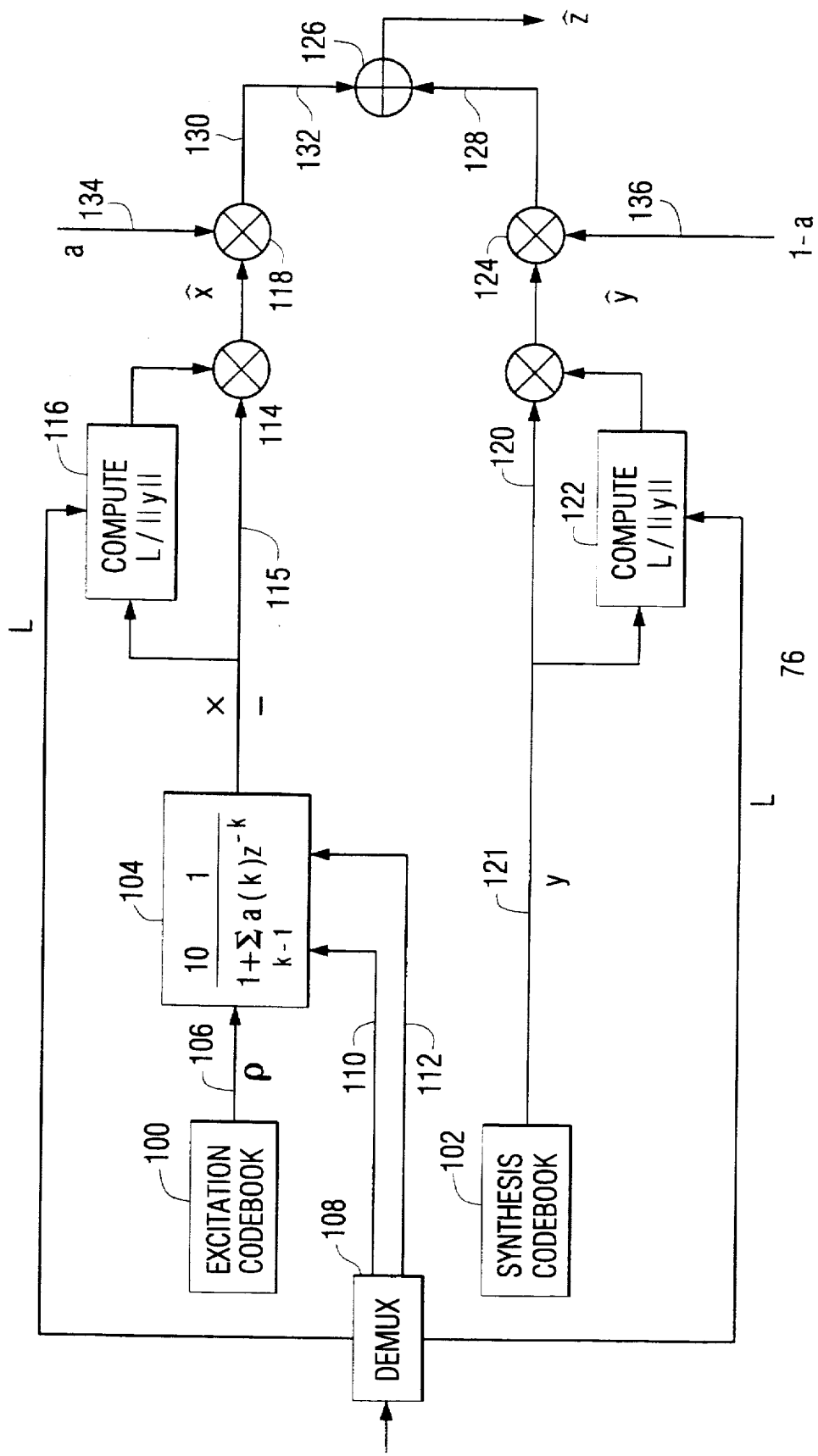
FIG. 3 is a functional block diagram of the comfort noise generator of FIG. 2 in accordance with the present invention.

Referring to FIG. 3, and as herein embodied, comfort noise generator 76 comprises an excitation codebook 100 containing a table of floating point numbers that correspond to long term estimates of spectrally flattened background noise and a synthesis codebook 102 containing a table of values corresponding to long term estimates of background noise. Codebooks 100 and 102 preferably each has approximately 4k of random entries, and include a clock that preferably reads out the codebook entries every eight milliseconds, for example.

An infinite impulse response filter 104 is connected to output 106 of codebook 100; and a demultiplexer 108 accepts the decoded synthesized noise from line 80 (See FIG. 2) of the receiver, and derives filter coefficients from the background noise received during the eighty milliseconds or two frames of delay over lines 110 and 112. The loudness level for each eight millisecond sample is obtained also by averaging the loudness level over the eighty millisecond periods.

A multiplier 114 normalizes each sample of an eight millisecond block of samples on line 115 corresponding to the output from filter 104 to the average RMS level or loudness derived from the final eighty milliseconds of transmission at the end of the speech spurt. The normalized scale factor is compared in block 116. A multiplier 120 similarly normalizes each entry of an eight millisecond block of samples from synthesis codebook 102 from line 121 to the average RMS level or loudness of the final eighty milliseconds of transmission at the end of the speech spurt. The normalized scale factor is compared in block 122.

The averaged outputs on lines 118 and 124 are summed at 126 through multipliers 128 and 130, to output on line 32, comfort noise which has the attributes of the final eighty milliseconds of transmission subsequent to detection of voice inactivity.

Prior to combining the signals on lines 118 and 124, they are multiplied by a weighting factor on lines 134 and 136, respectively. Weight factor $\alpha$ on line 134 for each block of sixty-four samples starts with a value 1.0 and decrements once every sixty-four samples by a small number 0.0D until it reaches zero. Weight factor $1-\alpha$ on line 136 starts at zero and increments once every sixty-four samples by the same small number 0.0D until it reaches "1;" the sum of the two weighting factors always equalling "1." This changes the mix of the loudness level and spectral shape of the comfort noise to more closely resemble reality and alleviate the feeling of artificiality during long periods of voice inactivity of a conversation.

Figure 4:
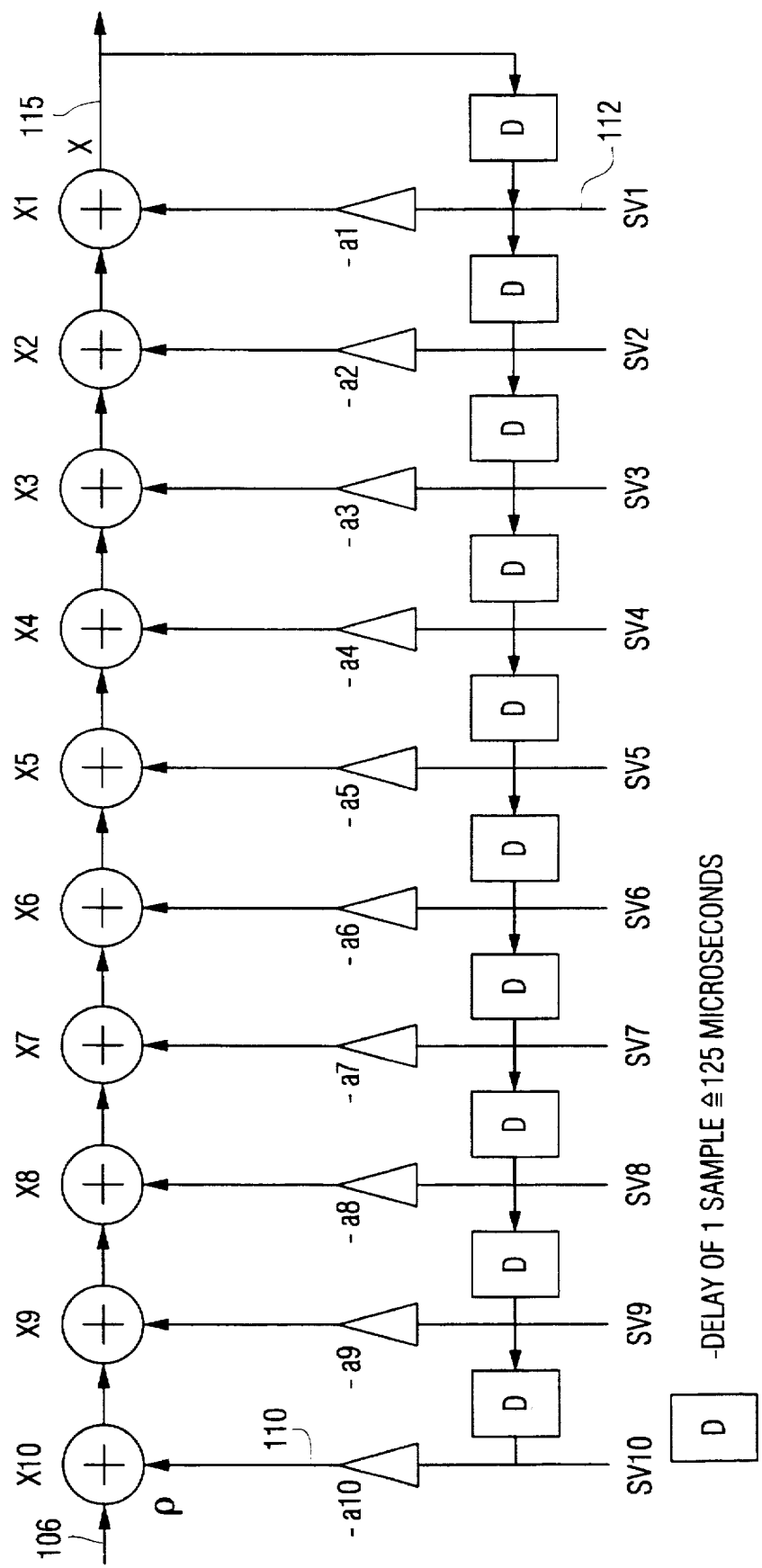
FIG. 4 is a schematic diagram of a filter used in the comfort noise generator of the present invention.

Referring to FIG. 4, filter 104 has ten summing stages X1 through X10. The entries from excitation codebook 100 enter the filter at X1. The output of the filter is moved successively every sample or 125 microseconds, similar to a shift register. These outputs are called state variables and are denoted by SV1 to SV10. At each summing stage, the state variables are multiplied by filter coefficients a1 through a10 at respective multipliers M1 through M10. These filter coefficients are derived from synthesized speech samples over two frames of information following the end of voice activity. The products of each of the multipliers M1 through M10 are summed at each step or cycle of the filter and output on line 115.

Figure 5:
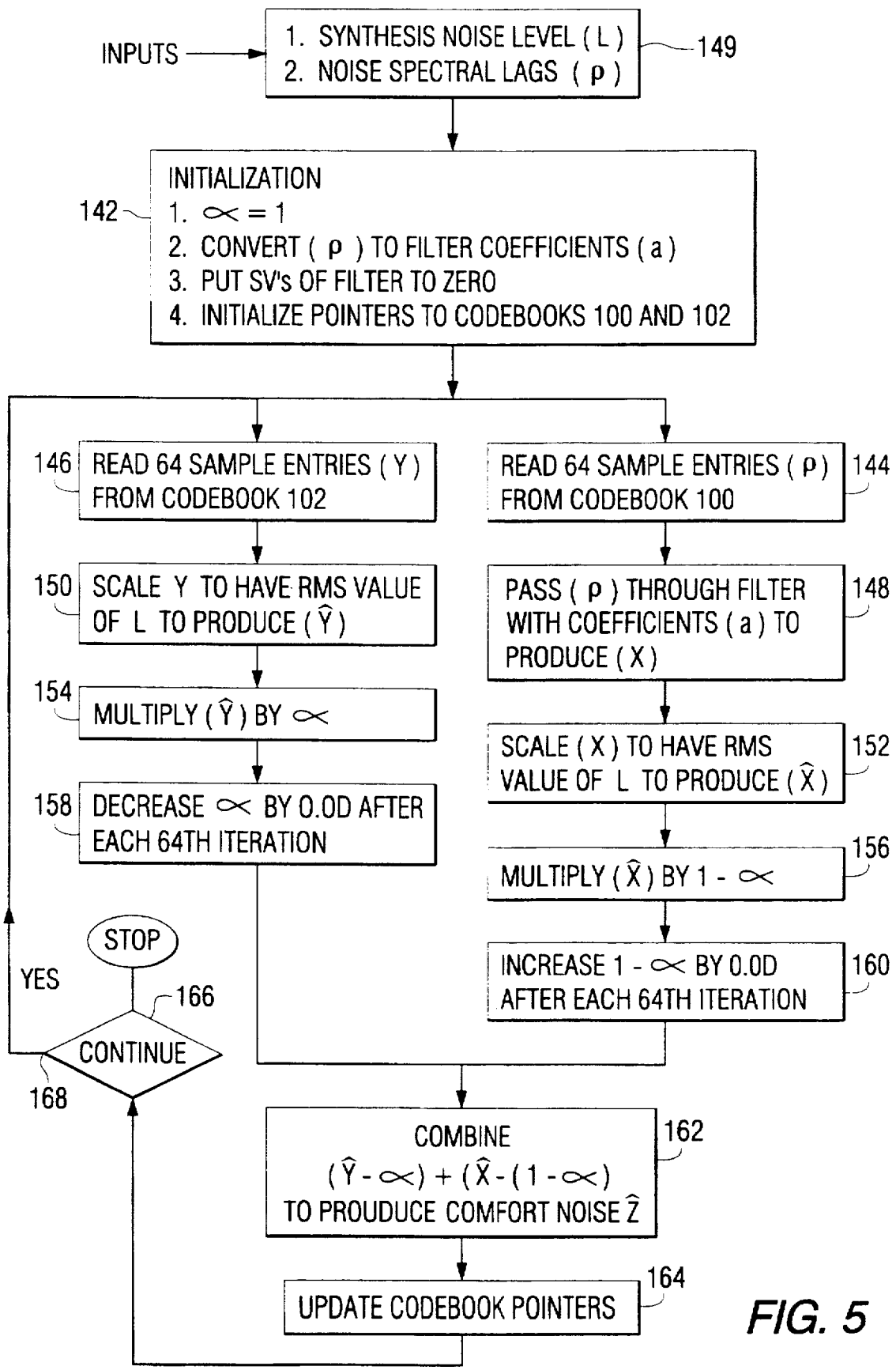
FIG. 5 is a flow chart of the comfort noise generator of FIG. 3.

Referring to FIG. 5, an algorithm, which may be installed in a fixed point digital signal processor, is illustrated as implementing the method and system of the present invention. As previously mentioned, the synthesized noise is input over line 80, as indicated at block 149, and is initialized by setting $\alpha$ to "1," deriving an average loudness level L, and converting the background noise autocorrelation lags representative of the spectral shape of the input noise to filter coefficients a, and setting state variables to zero, as indicated at block 142. Once the system is initialized, it is operating both during periods of voice activity as well as inactivity. Since switch 66 does not close until eighty milliseconds after the cessation of voice activity, filter 76 will have filter coefficients that correspond to background noise only.

Every eight milliseconds or five times each frame, a series of sixty-four sample entries are simultaneously read from excitation codebook 100 and synthesis codebook 102 as indicated at blocks 144 and 146 respectively. The entries from codebook 100 are passed through filter 104 having coefficients corresponding to the last two frames transmitted as indicated at block 148. Each sample entry from synthesis codebook 102 is scaled to have a value corresponding to a two frame average of the loudness level L as shown at block 150. Also, the outputs of the filter 104 are scaled to have a loudness level averaged over the last two frames of received data as shown at block 152. Each RMS value from block 150 is weighted with α at block 154; and each RMS value from block 152 is weighted with α at block 156. Every 64th sample α is decremented by 0.00D and 1-α is incremented as illustrated at blocks 158 and 160. The scaled and weighted synthesized values Y .α and X .(1-α) are combined to produce the comfort noise Z at block 162. The codebook pointers are updated in block 164 at the end of the eight MS interval. If there is still no voice activity, the process is repeated as indicated at decision block 166 to commence as indicated by line 168.

Having described the presently preferred system embodiment and method of the invention, additional advantages and modifications will readily occur to those skilled in the art. For example, the sampling times could be varied as well as the frequency with which the weights are incremented or decremented. Also, the switch could provide for a greater or lesser delay before discontinuing transmission upon detection of voice inactivity, or the number of stages of the filter could be increased or decreased, if desired, for example. Accordingly, the invention in its broader aspects is not limited to specific details, representative apparatus, and illustrative examples shown and described. Departure may be made from such details without departing the spirit or scope of the general inventive concept as defined by the appended claims and their equivalents.

What we claim is:

1. A method of generating background noise during voice inactivity intervals in a communication system having a transmitter with an encoder for encoding and transmitting audio data, and a receiver remote from the transmitter with a decoder for receiving and decoding the transmitted audio data, said method comprising the steps of:

encoding audio data in the transmitter and transmitting the encoded audio data to the receiver;

detecting in the transmitter voice activity and voice inactivity;

continuing transmission of encoded audio data during a predetermined time interval following each detection of voice inactivity;

discontinuing transmission of encoded audio data at expiration of each said predetermined time interval;

resuming transmission of encoded audio data upon detection in the transmitter of voice activity;

decoding in the remote receiver the encoded audio data received from the transmitter;

detecting in the remote receiver voice activity and voice inactivity at the transmitter;

processing in the receiver the decoded audio data including data received during each said predetermined time interval after the detection of voice inactivity in the transmitter, the step of processing includes deriving a first series of output signals corresponding to an average loudness level of received noise, deriving a second series of output signals having spectral shape attributes corresponding to the received noise, combining the first and second series of derived signals to generate the audible analog audio representing background noise, the step of deriving includes weighting each of the first and second series of signals successively to vary the loudness level and spectral shape during periods of voice inactivity, the step of weighting each of the first and second series of signals includes multiplying each of the first series of signals by a first weighting factor and each of the second series of signals by a second weighting factor, the first and second weighting factors being varied to vary the loudness level and spectral shape, the first weighting factor is defined as a first variable α and the second weighting factor is defined as a second variable 1-α; and repeatedly generating audible analog audio representing background noise based upon the audio data processed during each said predetermined time interval until the resumption of transmission of the encoded audio data.

2. The method of claim 1 wherein the weighting of each of the first and second series of signals successively includes repeatedly incrementing the value of the first variable α in steps from a minimum value to a maximum value and then decrementing the first variable α from the maximum value to the minimum value.

3. The method of claim 2 wherein the value of the first variable α is repeatedly incremented in at least ten steps, at a rate of one step per sixty-four signals from zero to one and then decremented from one to zero at said rate.

4. A system for generating comfort noise for a digital communication system during a period of voice inactivity immediately following a period of voice activity based on received data representing background noise during said period of voice activity, comprising:

a synthesis codebook having a first table of values corresponding to long term estimates of background noise;

an excitation codebook having a second table of values corresponding to long term estimates of spectrally flattened background noise;

means including the received data during each said period of voice inactivity and values from the first table of the synthesis codebook for producing a first series of signals having a loudness level averaged over a plurality of frames of data;

means including the received data during each said period of voice inactivity and the second table of values from the excitation codebook for producing a second series of signals having spectral shape attributes corresponding to the received data;

means for combining the first and second series of signals to generate the background noise during said period of voice inactivity;

means for deriving filter coefficients from the received data, wherein the means for producing the second series of signals includes an infinite impulse response filter for filtering values from the excitation codebook second table in accordance with the derived filter coefficients;

means for scaling output signals of the infinite impulse response filter to produce the first series of signals, each having a loudness level corresponding to an average RMS level over a predetermined time period following voice inactivity and to produce the second series of signals each having a spectral shape corresponding to long term spectral shape of background noise with said loudness level; and means for weighting the first series and second series of signals to vary the loudness level and spectral shape periodically, including means for multiplying each of the first series of signals by a first weighting factor and each of the second series of signals by a second weighting factor, the first and second weighting factors being varied to vary the loudness level and spectral shape, wherein the first weighting factor is defined as a first variable α and the second weighting factor is defined as a second variable 1-α.

5. The system of claim 4 wherein the value of the first value α is repeatedly incremented in steps from a minimum value to a maximum value and then decremented from the maximum value to the minimum value.

6. A system for generating comfort noise for a digital communication system during a period of voice inactivity immediately following a period of voice activity based on received data representing background noise during said period of voice activity, comprising:

a synthesis codebook having a first table of values corresponding to long term estimates of background noise;

an excitation codebook having a second table of values corresponding to long term estimates of spectrally flattened background noise;

means including the received data during each said period of voice inactivity and values from the first table of the synthesis codebook for producing a first series of signals having a loudness level averaged over a plurality of frames of data;

means including the received data during each said period of voice inactivity and the second table of values from the excitation codebook for producing a second series of signals having spectral shape attributes corresponding to the received data;

means for combining the first and second series of signals to generate the background noise during said period of voice inactivity wherein the means for producing the first and second series of signals includes means for weighting each of the signals of the first and second series of signals to vary the spectral shape and loudness level of the background noise, including means for multiplying each of the first series of signals by a first weighting factor and each of the second series of signals by a second weighting factor, the first and second weighting factors being varied to vary the loudness level and spectral shape wherein the first weighting factor is defined as a first variable $\alpha$ and the second weighting factor is defined as a second variable $1-\alpha$.

7. The system of claim 6 wherein the value of the first variable $\alpha$ is repeatedly incremented in steps from a minimum value to a maximum value and then decremented from the maximum value to the minimum value.

* * * * *